Oct. 22, 1940.   J. H. K. McCOLLUM ET AL   2,219,270
AUTOMATIC CLUTCH ACTUATING MECHANISM
Original Filed Jan. 17, 1931
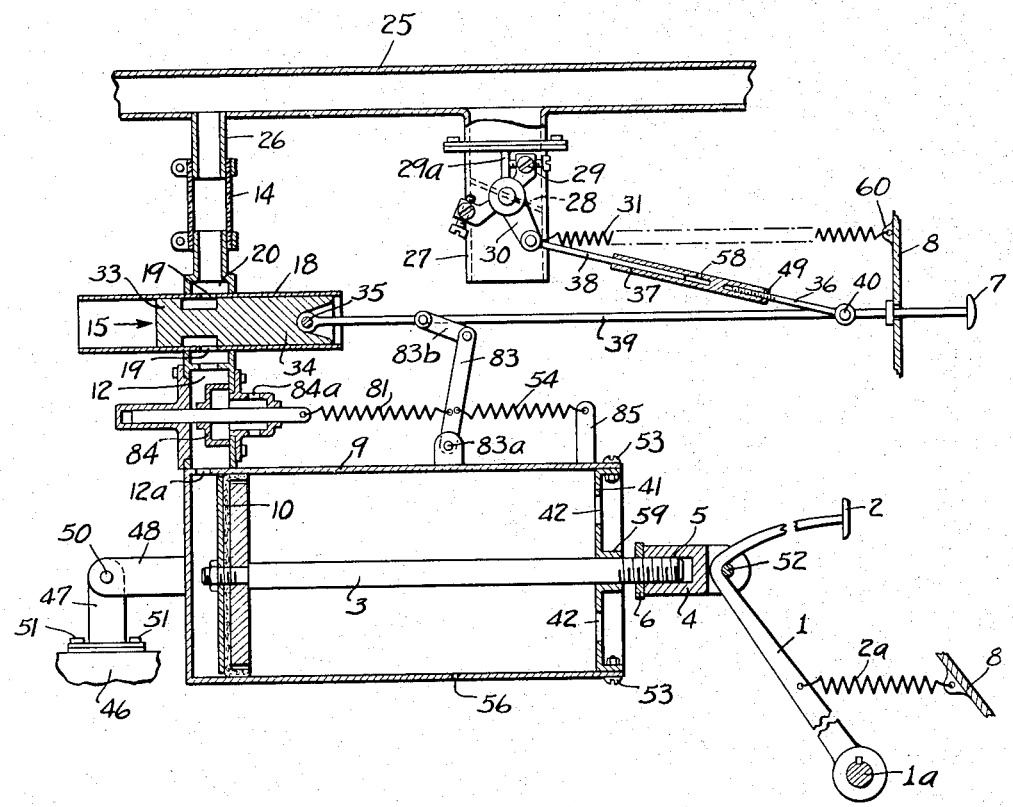
INVENTORS
JAMES H. K. McCOLLUM
HENRY J. DeN. McCOLLUM
BY
ATTORNEY Patented Oct. 22, 1940

2,219,270

UNITED STATES PATENT OFFICE 2,219,270

AUTOMATIC CLUTCH ACTUATING MECHANISM

James H. K. McCollum and Henry J. De N. McCollum, Evanston, Ill.

Original application January 17, 1931, Serial No. 509,310. Divided and this application September 25, 1935, Serial No. 42,168

44 Claims. (Cl. 192—.01)

This invention relates generally to automatic clutch-operating mechanism such as is now quite commonly used on motor cars propelled by gas engines to relieve the car driver from directly opening and/or closing the power transmitting clutch during many periods of car operation, said mechanism automatically disengaging such clutch whenever the throttle of the gas engine is closed to idling position, and permitting the clutch to engage when or just before such throttle is opened.

In such mechanism it is important that the clutch-engaging movement of the clutch lever, or other clutch-actuating element, which usually is normally biased to occupy a clutch closing or engaging position, shall occur in two stages, i. e., a first stage which will move the clutch elements proper up to initial engagement and shall be as rapid as is conveniently possible, and thereafter a second, slower stage for completion of the clutch engagement—this latter to prevent "grabbing of the clutch" and sudden jerking of the car.

Various forms of apparatus for producing such two-stage operation in the automatic closing or engaging of a clutch, are shown and described in our co-pending application Serial No. 509,310, filed January 17, 1931, of which this present application is a division.

In certain of the several types of apparatus illustrated in our said prior application the point in the clutch closing movement of the automatic apparatus at which the second, or slower, stage of such movement begins is fixed. Thus, if the servo-motor which moves the clutch-actuating lever comprises a vacuum cylinder with a piston moving therein and operatively connected to such lever, the second stage of the piston movement may begin when it closes or passes a port in the cylinder walls. For proper operation, such apparatus must be so designed that such piston will reach that port just as the slack of the clutch mechanism has been taken up and the initial contact between the clutch faces occurs. Although, however, a new apparatus may have been carefully thus adjusted, it is obvious that after the clutch faces have been worn down in use, and other additional slack in the operating parts has similarly resulted, the two-stage mechanism proper will have gotten out of registry, and thereafter will begin to check the clutch closing movement before any clutch engagement has occurred, thus delaying clutch engagement and permitting the motor to race before any load is thrown on it by any partial or complete clutch closure, especially if the throttle control is operated contemporaneously with the clutch control.

To overcome this difficulty to a certain extent the connection from piston to clutch lever may be made adjustable as to length as shown, described and claimed in our said application Serial No. 509,310. The lengthening of this piston connection from time to time, to the proper extent, will then temporarily compensate for such previously occurring wear of the clutch parts and restore the proper timing of the two-stage mechanism until further wear of the parts compels a further readjustment.

It is the object of the present invention, however, to provide (in addition to the possible adjustment in length of piston rod for initial installation) means for making the two-stage mechanism automatically and continuously self-adjustable as to timing, so that it will, after installation and initial adjustment, automatically compensate for clutch wear and always begin the second and/or slower stage of its clutch closing movement whenever the initial engagement of the clutch faces occurs.

In the accompanying drawing, which is a copy of Fig. 5 of our prior application Serial No. 509,310 (of which this is a division) and is a diagrammatic vertical section of a power-operated clutch controlling mechanism with its attachment to certain parts of a motor car (shown broken away), there is shown one form of apparatus which is designed to operate in accordance with the principle of automatic, second-stage adjustment last above referred to.

Referring to the drawing, the usual clutch pedal of a motor car is shown at 2, a portion of the chassis of which car is shown at 46. This pedal is mounted on the clutch lever 1, which is keyed to the clutch operating shaft 1ª and normally held in a clutch engaging position by the tension of the spring 2ª. Consequently this motor-vehicle clutch has a normal bias toward operative condition with the elements thereof in engagement with each other.

25 is a section of the intake manifold of the motor to which the combustible mixture is admitted through the carburetor 27 having a throttle valve 28 of the usual butterfly type operated by the throttle lever 30 and limited in its movement by the adjustable stop mechanism 29 cooperating with the fixed stop rib 29ª.

This throttle valve is normally held in nearly closed or idling position by the spring 31 anchored at 60. It can be opened by motion of the accelerator pedal 7 mounted on rod 39 projecting through footboard 8 and having a pivotal connection at 40 to the accelerator rod 36 which has a lost-motion connection to the throttle rod 38 which is pivoted to the throttle lever 30. The cup-shaped sleeve 37 is adjustably mounted on the end of the rod 36 by means of the screw thread connection there shown. 49 is a locknut. Throttle rod 38 slides in this sleeve and when the pedal 7 is fully retracted by the action of spring 54, there is a gap left between the end of rod 38 and the bottom of cup-shaped sleeve 37. Port 58 admits air to this space so as to permit free movement of the parts. When the accelerator pedal 7 is forced by the operator's foot toward the left the first action of this portion of the apparatus will be to take up this lost motion, and thereafter subsequent movement of the pedal will cause an opening movement of the throttle valve.

The power mechanism for operating the clutch shown in this drawing comprises the vacuum cylinder 9 which is pivotally mounted on the chassis 46 by means of the pedestal 47 fastened to the chassis by screw bolts 51, 51, and the lug 48 projecting beyond the closed end of the cylinder and hinged or pivoted to the pedestal 47 at 50.

On the outer end of the piston rod 3 is the screw thread 5 by means of which it is adjustably connected to the fork 4 which carries the pin 52 in its open end, forming a pivotal connection with the pedal lever 1. There is a locknut 6 on the piston rod. 12 is a conduit connected to the left hand end of cylinder 9 by the port 12ᵃ and connected at its other end to a port 19 in the casing 18 of the piston valve 15.

The right hand end of the cylinder 9 has the skeleton head 41 held in place by the screws 53, and serving by means of the central perforated boss 59 as a guide for the piston rod 3, the openings 42 in such piston head rendering the right hand end of the cylinder interior open to the atmosphere. The left hand end of the cylinder, on the other side of the piston 10, being connected by port 12ᵃ and passageway 12, as before described, to the interior of the valve casing 18, is also (when valve 15 is in the position shown in the drawing) further connected through ports 19, nipple 20, rubber coupling 14 and nipple 26, to the interior of the intake manifold 25. The rubber coupling 14 is inserted to permit the slight movement of the cylinder 9 and the valve connections which occurs about the pivot 50 on account of angularity of the clutch lever 1 to which the piston rod is connected at 52. The valve 15 is of the double piston type having the two full bodied sections 33 and 34 separated by an annular portion of reduced cross section. This valve is pivotally connected at 35 to the accelerator rod 39. This rod is also connected by link 83ᵇ to swinging lever 83 having a fixed pivot at 83ᵃ on the cylinder 9, and tension spring 54, connected to lever 83 and anchored at 85 on the cylinder 9, serves as an accelerator return spring, normally biasing the accelerator to occupy the position shown in the drawing, with the valve 15 so located that its said annular portion of reduced diameter is opposite ports 19, thus establishing communication from the left hand end of cylinder 9 to the intake manifold 25.

The right hand piston portion 34 of valve 15 is elongated so that after the accelerator 7 has been started in its movement toward the left to take up the lost motion in the throttle connection and close the ports 19 so that suction of the intake manifold 25 is closed off from cylinder 9, the additional considerable movement of the accelerator necessary to give full throttle opening will not reopen ports 19. Consequently such opening only occurs when the operator takes his foot off the accelerator 7 and spring 54 pulls the parts back into the position shown in the drawing.

A reducing valve 84 normally biased for closure by spring 81 admits air through ports 84ᵃ to conduit 12 and cylinder 9, whenever the pressure differential on it caused by subatmospheric pressures within the latter is enough to further stretch spring 81.

The operation of the above described apparatus is as follows:

With the parts in the position shown in the drawing, the clutch is held open by the vacuum in the intake manifold 25 and the throttle is in idling position. If the car is standing still and the operator wishes to start it in motion, he presses the accelerator button 7 a short distance to the left against the resistance of spring 54, thus taking up the lost motion in the throttle connection 37, 38, and moving the valve 15 far enough to close the ports 19 and shut off the intake manifold suction from cylinder 9. This motion of the accelerator slightly reduces the tension on spring 81 so that the remaining tension is not sufficient to withstand the full vacuum suction on the reducing valve 84. Consequently that valve opens slightly and allows air to enter the left hand end of the cylinder until the resultant movement of the piston 10 to the right (under the pull of the clutch springs, conventionally indicated at 2ᵃ) allows the clutch lever 1 also to begin swinging to the right, and this condition continues until the reduced tension of the clutch springs produced by the partial clutch closure has caused their tension to equalize with the previously reduced tension of spring 81, whereupon the valve 84 will close and the parts will stop in the positions then assumed. If, however, accelerator 7 has been pushed far enough to the left to begin to open the throttle, the tension on the spring 81 will have been sufficiently further reduced to allow the piston 10 to have moved past the leakage port 56 before the above described equalization of tension of springs 2ᵃ and 81 will have occurred, and then, after the closure of the valve 84, the slow intake of air through port 56 will permit the slower second stage of clutch closure movement to occur, although this second stage of clutch movement of course may have its initiation delayed somewhat by an extreme depression of accelerator 7 which, while opening throttle valve 28 will have so reduced tension on spring 81 that valve 84 will be free to open and stay open until nearly atmospheric pressure has been established in the lefthand end of cylinder 9, and so put the clutch in substantial but not full engagement promptly.

The above described mode of operation may be described in another way, as follows:

The closing of the valve 84 occurs whenever the subatmospheric pressure in cylinder 9 rises to a certain amount predetermined by the tension of spring 81. Some such rise of pressure will always occur whenever the outward movement of piston 10 under the pull of the clutch closing spring 2ᵃ slows down, and when such increase of internal pressure has reduced the remaining excess of pressure of the exterior atmosphere on the outer face of valve 84 to a given extent, spring 81 will thereupon close it. Such slowing down may result from the diminishing pull of the clutch closing springs as their extent of flexure is reduced in the final stages of the clutch closing movement (as before described), or may result from any sufficient slowing down of the speed of the piston movement resulting from other causes, as by the resistance resulting from the initial engagement of the clutch members. The latter occurrence will produce a rise of pressure sufficient to close valve 84 and a slower, second and final stage of clutch closing action will then follow, since air can thereafter enter the cylinder 10 only slowly through leakage port 56 if piston 10 has then passed that port, or by further movement of accelerator 7 to the left.

It will therefore be seen that the servo-motor, comprising the vacuum cylinder 9, piston 10 and piston rod 3, with the valve connections described, forms in substance a pressure responsive device connected to the motor vehicle clutch and operative for moving the clutch elements out of engagement with each other. The conduits 26, 14, 20 and 12 constitute a fluid transmitting connection interconnecting manifold 25 and said servo-motor. Valve 15, with its casing 18, form what may be called a primary control valve incorporated in said connection. Valve 84 may be termed a secondary valve means for controlling the clutch engaging operation of said servo-motor. Spring 81 constitutes a yieldable means operating on said latter valve. Ports 84a constitute means for connecting said secondary valve means with the atmosphere, and port 12a forms a fluid transmitting means interconnecting said secondary valve with the servo-motor. Furthermore, while the valve 15 acts directly to open the suction connection and cause a clutch disengaging operation of the servo-motor, it also acts directly to initiate a clutch engaging operation of the servo-motor by closing the vacuum connection and so rendering such operation possible, and acts effectively (if indirectly) for that purpose by swinging lever 83 to the left to reduce the tension on spring 81 so that the full manifold vacuum trapped in cylinder 9 by the closing movement of valve 15 to the left may open valve 84 and permit air to flow into said cylinder behind piston 10. In performing this last mentioned function, valve 15 acts through the linkage comprising pivot 35, on valve 15, the lefthand portion of rod 39 and the link 83b connecting the latter to lever 83, which lever serves as an adjustable anchorage for spring 81. Therefore, the movements of primary valve 15 initiate a clutch engaging operation because if it does not first move to the left and shut off the manifold suction, no such clutch engaging operation could occur even if valve 84 were opened by some other means and also because valve 84 cannot open till after valve 15 has moved to the left to reduce the tension on spring 81. Unless some means for reducing the tension on spring 81 is provided, it will never open. It is evident, therefore, that the parts are so constructed and arranged that with operation of said primary valve to initiate a clutch engaging operation of the motor, the secondary valve remains operative to admit atmosphere to the motor and effect a relatively rapid engaging movement of the driven clutch element until the driven clutch element is moved into contact with the driving clutch element, whereupon the secondary valve is automatically operated to in part close off the communication of the motor with the atmosphere and thereby effect a retardation in the clutch engaging movement of the driven clutch element, such movement thereafter continuing at the greatly reduced speed permitted by inflow of air through leakage port 56, which will have been brought into action by reason of the piston 10 having passed it so that it then opens into the vacuum space behind the piston.

Such passage of piston 10 beyond port 56 would normally occur because the standard clutch mechanism is so adjusted that the lever 1 swings about half way back from its extreme forward movement, producing a wide open position of the clutch, before the initial contact between the clutch faces occurs, and furthermore the degree of slackening of tension on spring 81 resulting from the closing movement of valve 15 would so reduce the effective pull of said spring as to prevent its closing the valve 84 (after the latter's initial opening under action of the full vacuum in cylinder 9) until the piston 10 had travelled some further distance to the right beyond the halfway point in its full movement, at which the initial clutch face contact would usually have occurred. This delayed closure of valve 84 will result in part also because an appreciable period of time must elapse after the motion of the piston has been checked by initial clutch-face contact before the originally low absolute pressure (high vacuum) in the cylinder behind the piston can be increased by inflowing air to a point that will permit valve 84 to close completely and shut off further inflow of air through ports 84a. By that time piston 10 usually will certainly have passed leakage port 56, and the slow, minute second stage of clutch closing movement effecting complete absorption of all further resilient yielding of the clutch parts will thereafter be permitted by slow inflow of air through such leakage port 56 while valve 84 remains closed.

Of course, if the operator pushes the accelerator far to the left for the purpose of increasing the power delivered by the engine so as to produce a quick getaway, the tension on spring 81 will be so greatly and so quickly reduced that all the air needed to equalize pressures on the two sides of piston 10 may quickly enter through ports 84a, and the second stage, slow motion producing, mechanism will be thereupon and thereby disabled.

The principles of operation of the invention may be further explained, as follows:

The cylinder 9, piston 10, piston-rod 3 and valves 15 and 84 constitute fluid pressure operated power means for disengaging the clutch and controlling the engagement thereof, and the valve 84 is automatically operable to vary the fluid pressure of said power means to thereby decrease the rate of movement of the driven clutch member as it moves into engagement with the driving member to thereby retard the completion of the clutch engaging operation of said power means. Such variation of the fluid pressure occurs at two or more points during the outward travel of piston 10 from the clutch-released position shown in the drawing according to the manipulation of the valve 15. The first variation in the air pressure in cylinder 9 occurs when lever 83 has been swung to the left by complete closure of valve 15, thereby reducing the tension of spring 81 which allows valve 84 to be opened by the then existing pressure differential effective on it. If (for example) the full manifold vacuum trapped in cylinder 9 when valve 15 thus closes is 8 lbs., and the reduction in tension on spring 81, resulting from a movement of 15 just sufficient to close ports 19, is 4 lbs. multiplied into the effective area in square inches of valve 84, the latter will open a given distance and air will begin flowing into the cylinder through ports 84a at the particular velocity produced by a pressure differential of 8 lbs. Piston 10 then moves to the right at a speed determined in part by the surplus of the pull of the clutch springs (conventionally indicated at 2a) over whatever pressure differential is then effective on the piston, (which latter would approximate the product of 8 lbs. multiplied by the piston area in square inches) and in part by the volume of air per unit of time flowing through the valve opening. These conditions will permit including the maintenance of a vacuum of approximately 8 lbs. in the cylinder until the initial contact of the clutch faces checks said piston movement and consequently reduces the subsequent rate of inflow of air behind it as the pressure there builds up and the pressure-differential on the air flowing in through partly open valve 84 is correspondingly reduced. After such checking of the velocity of inflow of air the gradually reduced inflow will thus gradually but rapidly reduce the vacuum behind the piston until it drops to 4 lbs., at which point valve 84 closes. This requires a perceptible period of time, even if valve 84 were specially designed to have the quick-closing action of a pop-safety-valve. During that period of time the piston passes leakage port 56, unless the latter is so located that the piston will have passed it just before clutch-face contact was initiated, and valve 84 began to close. Thereafter piston 10 will, as a result of leakage through port 56, move the minute distance necessary to take up the residual elasticity of the partly compressed clutch linings and of the clutch operating levers and linkage. The time required for this final stage of piston movement (valve 84 being then closed) will be determined (of course) by the area of port 56.

The entire period of clutch closing operation of the servo-motor is therefore divided into two stages, a first stage of rapid movement, prior to initial clutch-face contact, and a second shorter period of slow movement thereafter, the latter acting to absorb the elasticity of the clutch elements and their pressure producing linkage. This second stage is itself divisible into two sub-stages, the first of which is contemporaneous with the period of time required for closure of valve 84 while the second is coextensive with the after-inflow of air through port 56. The first stage of relatively rapid movement is automatically terminated when, and only when, initial contact of the clutch faces occur, which is one of the objects of the present invention. In some other forms of "two-stage" apparatus, in which the point of transition from one stage to the other is fixed by a manual pre-adjustment of the parts, the rapid movement may be terminated some considerable time before clutch contact occurs, if the clutch linings have been worn down thin after a period of use.

Analysed in terms of clutch loadings, the cycle of operations may be described as follows: The maximum clutch load is the effective pressure of the clutch springs. The clutch load is zero when and while the air pressure differential on piston 10 is sufficient to overpower the full clutch-spring pressure and hold the clutch faces apart or to delay their being forced together. This condition of zero loading, which exists while valve 15 is open, also persists during the first period of inflow of air through valve 84 after 15 is closed, though the pressure differential on piston 10 has then dropped slightly below the pull of the clutch springs, thus permitting them to pull the piston to the right, and consequently it persists during this first and more rapid stage of clutch closing movement. The moment contact between clutch faces occurs, however, clutch loading begins and must ultimately attain, and remain at, its maximum during road operation of the car.

Another object of the invention is to prevent the attainment of such maximum loading instantly, on clutch contact, or its too rapid increase from zero immediately after such contact. "Clutch loading" simply means pressure between clutch faces, and as that means friction, obviously a sudden production of a high degree of friction would mean "clutch grabbing" and a jerking of the car. The present invention automatically checks that increase of loading when any predetermined desired amount has been attained and practically immediately after clutch-face contact. This is because at the moment of contact the vacuum behind the piston begins to drop rapidly, which means that the absolute air pressure on the piston's rear side begins to rise, and consequently the pressure differential on the piston begins to fall more and more below the pull of the clutch springs, the difference between these two being absorbed as it develops by the increasing resistance to further compression of the slightly elastic clutch faces. This means that the clutch loading, starting at zero, goes up rapidly after initial contact of the clutch elements, which is merely another way of saying that the pressure of one clutch element on the other is increased, as that is what is meant by loading. This "clutch loading" therefore increases directly as does the absolute air pressure in the cylinder and vice versa. When the latter reaches a point which permits the valve 84 to close automatically under the pull of its spring 81, the cylinder pressure stops increasing, except as it may thereafter rise further very slowly by reason of inflow of air through port 56, and the piston stops moving, being held in position then reached by equalization of the air pressure differential exerted on its outer face, and the net pull of the total clutch spring pressure over the clutch loading then attained. Consequently valve 84 is automatically operable in response to variation in the fluid pressure of the power means to decrease the rate of engagement of the clutch. Also, said valve and its spring 81 constitute means automatically operable at or above a given loading of the clutch members (determined by the tension of spring 81 and adjustable by movement of lever 83) to decrease the rate of movement of the driven clutch member (meaning that member which is driven by the other after clutch closure) as it moves into engagement with the driving member. And it is so operable to thereby retard the completion of the clutch engaging operation of the power means (servo-motor 9, 10) and reduce said clutch engaging operation to the particular slower rate of movement permitted by inflow of air through leakage port 56.

If, after the first, almost instantaneous increase of clutch loading has been attained, as above described, valve 15 is moved one or more times a little further to the left by successive further depressions of accelerator 7, one or more additional rapid increases of clutch loading (say to 5, 6 and 7 lbs. per unit of piston area) may be produced, and thereafter the final slower rise to maximum clutch loading occurs as the result of slow leakage of air through port 56, as before.

Means other than those herein shown and above described might be substituted and operate to similarly and automatically check the clutch closing movement of lever 1 whenever the initial contact between the clutch faces occurs, thus rendering the initiation of the slower, second stage of clutch-closing movement automatically self-adjusting to suit varying conditions of wearing down of the clutch elements, and such would still be within the scope of our invention as hereinafter defined in certain of the broader appended claims.

Having described our invention, we claim:

1. In a pneumatic apparatus for actuating a movable member of a mechanism adapted to operate the power transmission clutch of a motor car, comprising a cylinder open to the atmosphere at one end and connected to the intake manifold of the motor at the other, a manually operable valve in said connection, a piston in said cylinder connected to said clutch operating member, and a spring normally tending to produce a clutch engaging movement of said member, whereby, when said valve in the intake manifold connection is opened said member will be pulled into a clutch disengaging position, the combination, with said above described apparatus, of automatic means adapted to produce a relatively rapid clutch engaging movement of said movable member followed by a slower movement for completion of the engagement comprising a poppet valve adapted to open and admit air to that end of said cylinder which is connected to said manifold, a spring normally tending to hold said valve closed and having a degree of tension sufficient to hold it closed during the latter portion of the travel of said movable member which produces clutch engagement while said clutch closing spring is partially expanded, but permitting said valve to open while the piston is subjected to the pull of fully compressed clutch springs at the beginning of its outward movement, and automatic means for holding said valve closed during the clutch disengaging movement of said piston and movable member connected thereto.

2. An apparatus such as defined in claim 1 combined with means for slowly admitting a separate supply of air to said cylinder during said latter portion of the travel of said movable member.

3. In a pneumatically operated clutch actuating apparatus comprising a movable clutch controlling member, a spring tending to move said member in a direction to close the clutch and a pneumatic motor device tending to move said member in a clutch-opening direction when air is exhausted therefrom, the combination with said above described apparatus of a valve controlling the admission of air to the interior of said pneumatic device and means for automatically closing said valve whenever the subatmospheric pressure in said motor device rises to a certain amount.

4. In an automotive vehicle provided with a clutch-actuating member, power means for operating said clutch-actuating member including a pneumatic motor and valve mechanism for controlling the operation of said clutch-operating motor, said valve mechanism comprising means for initiating the clutch-disengaging and engaging operations of said motor, and further comprising means operable in accordance with the degree of vacuum within one end of said motor to abruptly reduce the rate of movement of the aforementioned clutch-actuating member as the clutch is being engaged.

5. In an automotive vehicle provided with a clutch-controlling member, pressure differential operated means for operating said clutch-controlling member comprising a vacuum actuated fluid motor including a reciprocable power element operably connected to the said member, and further comprising valvular mechanism for controlling the fluid pressure within said motor, said valvular mechanism comprising manually operated means for initiating the clutch-disengaging and engaging operations of said motor, and further comprising means operable by and in accordance with the vacuum created within the motor as the clutch is being engaged to abruptly modify the rate of change of pressure differential acting on the aforementioned reciprocable power element to thereby abruptly decrease the rate of engaging movement of the clutch.

6. The combination with an automotive vehicle provided with an internal combustion engine and a clutch controlling member, of vacuum-operated power means for operating said member, said power means including a vacuum actuated motor having a chamber containing a reciprocable element operatively connected with said member, a conduit interconnecting one end of said chamber with the intake manifold of said engine, valvular mechanism for controlling the flow of air to and from said chamber; said valvular mechanism comprising means for initiating the clutch disengaging and engaging operations of said motor by alternately opening and closing the connection between said manifold and said chamber, and further comprising a valve member operable to admit air from the atmosphere to the chamber interior after the aforementioned means has been operated to initiate the engagement of the clutch, together with yieldable means acting on said valve member, said valve member being subjected to a pressure-differential created by the pressure of the atmosphere acting on one side thereof and the partial vacuum in said motor chamber acting on the other side, said pressure differential acting in opposition to the force of said yieldable means, whereby, when the degree of vacuum within said chamber is decreased to a predetermined degree, said yieldable means functions to permit movement of said valve member to cut off the then existing communication between the atmosphere and said chamber around said valve member.

7. An apparatus such as defined in claim 6 combined with means for slowly admitting additional air to said motor chamber after said valve member has shut off the initial admission of air thereto.

8. In an automobile equipped with an internal combustion engine for propelling it, a pedal for controlling said engine, a clutch-actuating member normally biased toward clutch-closing position, and a vacuum-actuated servo-motor for moving said member to clutch-opening position together with a manually operable valve adapted to open and close a vacuum connection to said servo-motor, the combination, with said above described apparatus, of means operable in response to pressure variation in the servo-motor for automatically controlling the clutch-closing movements of said motor comprising a reducing valve normally biased by yielding means toward closed position and adapted to admit automatically regulated volumes of air to the vacuum space in said servo-motor after said vacuum connection has been closed.

9. Means such as defined in claim 8 combined with mechanism for automatically admitting an additional small volume of air to said vacuum space during the latter portion of the clutch-closing movement of said clutch-actuating member.

10. Means such as defined in claim 8 combined with a manually operable device for modifying the action of said reducing valve while the clutch-closing operation is going on.

11. Means such as defined in claim 8 combined with a manually operable device for modifying the action of said reducing valve while the clutch-closing operation is going on simultaneously and correspondingly with the movement of said engine controlling pedal.

12. Means such as defined in claim 8 which comprise a connection from said reducing valve to said engine-controlling pedal operative to cause said reducing valve to admit increasing volumes of air to said vacuum space as the power delivered by the engine is increased.

13. Means such as defined in claim 8 comprising a tension spring connected to said valve at one end and to a lever at the other, and an operative connection from said lever to said engine-controlling pedal such that as the latter is moved to increase the power being delivered by the engine it will so swing said lever as to decrease the tension on said spring.

14. A combination such as defined in claim 8 in which said manually controllable connection from the intake manifold comprises a valve so connected to said engine controlling pedal as to be closed during substantially the entire period of engine-controlling movements of the latter.

15. In a vacuum power clutch mechanism, for a motor car having a clutch operating member, an intake manifold, a carburetor, throttle valve and throttle arm having a return spring, and a throttle rod having adjustable lost motion, the combination, with said above described mechanism of two valve casings and valves therein, an accelerator, one of said valves being positively attached to said accelerator and said accelerator being operatively connected to said throttle rod, a cylinder having a small leakage port in its wall and mounted on the car frame, a lever mounted on a fixed pivot and operatively connected to said accelerator, a spring tending to retract said accelerator, a spring connecting said lever and the other valve, conduits, controlled by said valves, connecting said cylinder to said intake manifold and to the atmosphere, a piston in said cylinder, provided with a piston rod of adjustable length operatively connected to said clutch operating member, said parts cooperating substantially as described.

16. In a pneumatic apparatus for actuating a movable member of a mechanism adapted to operate the power transmission clutch of a motor car, comprising a cylinder open to the atmosphere at one end and connected to the intake manifold of the motor at the other, a manually operable valve in said connection, a piston in said cylinder connected to said clutch operating member, and a spring normally tending to produce a clutch engaging movement of said member, whereby, when said valve in the intake manifold connection is opened said member will be pulled into a clutch disengaging position, the combination, with said above described apparatus, of automatic means adapted to produce a relatively rapid clutch engaging movement of said movable member followed by a slower movement for completion of the engagement comprising a poppet valve in said intake manifold connection opening inwardly to admit air thereto, a spring normally tending to hold said valve closed and mechanism connecting said spring and said manually operable valve adapted to cause any closing movement of said valve to diminish to a proportionate extent the effective tendency of said spring to hold said second valve closed.

17. A combination such as defined in claim 16 in which said manually operable valve is capable of continued movement after its initial closing: whereby, after said piston has been permitted an initial movement by said initial valve closure, a slight further movement of said valve will slightly increase the preexisting, initially produced reduction of such spring flexure, and a final, slower movement in the clutch engaging operation is thereby to that extent permitted.

18. A combination such as defined in claim 16 in which said cylinder is provided with a leakage port in its wall at a point such that said piston will have passed it before its clutch engaging movement is completed.

19. In an automotive vehicle provided with an internal combustion engine and a clutch actuating member, pressure differential operated means for operating said clutch actuating member, a motor operably connected to the clutch, a fluid transmitting connection interconnecting one end of said motor with the engine, and valve means for controlling the flow of power fluid to and from said motor, said valve means comprising means operable to alternately open and close the fluid transmitting connection to initiate the clutch disengaging and engaging operations of said motor, and further comprising other means operative to permit an influx of power fluid into said motor to effect a relatively rapid first stage of engaging movement of the clutch, and further operative to automatically appreciably reduce the rate of influx of power fluid to said motor when the friction elements of the clutch contact one with the other.

20. In an automotive vehicle provided with an internal-combustion engine and a clutch actuating member, pressure differential operated means for operating said clutch actuating member, a motor operably connected to the clutch, a fluid transmitting connection interconnecting one end of said motor with the engine, and valve means for controlling the flow of power fluid to and from said motor, said valve means comprising manually operated means operable to alternately open and close the fluid transmitting connection to initiate the clutch disengaging and engaging operations of said motor, and further comprising other means operative to permit an influx of power fluid into said motor to effect a relatively rapid first stage of engaging movement of the clutch, and further operative to automatically appreciably reduce the rate of influx of power fluid to said motor when the friction elements of the clutch contact one with the other, said valve means further comprising means for effecting a relatively slow engaging movement of the clutch after the termination of the aforementioned rapid first stage of movement.

21. In an automotive vehicle provided with a clutch actuating member, power means for operating said clutch actuating member, including a motor and valve means for controlling the operation of said clutch operating motor, said valve means comprising means for initiating the clutch disengaging and engaging operations of said motor, and further comprising means operable in accordance with the degree of vacuum within one end of said motor to abruptly reduce the rate of movement of the aforementioned clutch actuating member as the clutch is being engaged.

22. In an automotive vehicle provided with a clutch, pressure differential operated means for operating said clutch comprising a fluid motor including a reciprocable power element operably connected to the clutch, and further comprising valvular means for controlling the gaseous pressure with said motor, said valvular means comprising manually operated means for initiating the clutch disengaging and engaging operations of said motor, and further comprising means operable by and in accordance with the vacuum created within the motor as the clutch is being engaged to abruptly change the rate of change of pressure differential acting on the aforementioned reciprocable power element to thereby abruptly decrease the rate of engaging movement of the clutch.

23. In an automotive vehicle provided with an internal-combustion engine and a clutch, vacuum operated power means for operating said clutch, said power means including a motor having a reciprocable element operatively connected with the clutch, a fluid transmitting connection interconnecting one end of said motor with the intake manifold of said engine, and valvular means for controlling the mode of flow of air to and from said motor, said valvular means comprising means for initiating the clutch disengaging and engaging operations of said motor by alternately opening and closing the connection between the manifold and motor, said valvular means further comprising a reciprocable valve member operable to admit atmosphere to the motor after the aforementioned means is operated to initiate the engagement of the clutch, yieldable means acting on said latter member, said reciprocable valve member being subjected to a pressure differential created by the effect of the atmosphere acting on one side of said member and the vacuum of said motor acting on the other side of said engine, said differential acting in opposition to the force of said yieldable means whereby when the degree of vacuum within said motor is decreased to a predetermined factor said yieldable means functions to move said reciprocable valve member to cut off the then existing communication between the atmosphere and motor via said reciprocable valve member.

24. In an automotive vehicle provided with an internal-combustion engine and a clutch, vacuum operated power means for operating said clutch, said power means including a motor having a reciprocable element operatively connected with a clutch, a fluid transmitting connection interconnecting one end of said motor with the intake manifold of said engine, and valvular means for controlling the mode of flow of air to and from said motor, said valvular means comprising means for initiating the clutch disengaging and engaging operations of said motor by alternately opening and closing the connection between the manifold and motor, said valvular means further comprising a reciprocable valve member operable to admit atmosphere to the motor after the aforementioned means is operated to initiate the engagement of the clutch, yieldable means acting on said latter member, said reciprocable valve member being subjected to a pressure differential created by the effect of the atmosphere acting on one side of said member and the vacuum of said motor acting on the other side of said engine, said differential acting in opposition to the force of said yieldable means whereby when the degree of vacuum within said motor is decreased to a predetermined factor said yieldable means functions to move said reciprocable valve member to cut off the then existing communication between the atmosphere and motor via said reciprocable valve member, said valvular means further comprising means operable after said aforementioned reciprocable valve means has cut off the connection between the atmosphere and motor to admit an additional amount of atmosphere into the motor.

25. Apparatus of the character described comprising a pressure responsive device connected to a motor vehicle clutch and operative for moving the clutch elements out of engagement with each other, means for supplying vacuum to said pressure responsive device to render it operative, means for at least partially releasing the vacuum acting on said pressure responsive device to release the clutch elements for movement toward operative engagement with each other, means operative upon initial contact of the clutch elements with each other for checking the motion of the clutch elements toward operative engagement, and means for releasing the clutch elements for movement into operative engagement after their movement has been checked by said last named means.

26. Apparatus of the character described comprising a pressure responsive device connected to a motor vehicle clutch, a conduit connected to a source of suction and to said device and operative for connecting said device to the source of suction to move the clutch elements out of engagement with each other, means operative upon the admission of atmospheric pressure to said conduit to release the clutch elements for movement toward operative engagement, said pressure responsive device operating to maintain a partial vacuum in said conduit during movement of the clutch plates toward operative engagement, means actuated by a drop in vacuum in said conduit occurring upon initial contact of the clutch elements for checking movement of the clutch elements toward operative engagement, and means for releasing the clutch elements for movement into operative engagement after their movement has been checked by said last named means.

27. Apparatus of the character described comprising a pressure responsive device connected to a motor vehicle clutch, a conduit connected to a source of suction and to said device and operative for connecting said device to the source of suction to move the clutch elements out of engagement with each other, means operative upon the admission of atmospheric pressure to said conduit to release the clutch elements for movement toward operative engagement, said pressure responsive device operating to maintain a partial vacuum in said conduit during movement of the clutch elements toward operative engagement, an elastically actuated valve operable to closed position by a drop in vacuum in said passage occurring upon initial contact of the clutch elements for checking movement of the clutch elements toward operative engagement, and means for releasing the clutch elements for movement into operative engagement after their movement has been checked by said last named means.

28. The combination with a motor vehicle clutch having a normal bias to operative condition with the elements thereof in engagement with each other, of a pressure responsive device connected to the clutch and operative for moving the clutch elements out of engagement with each other, means for supplying vacuum to said pressure responsive device to render it operative, means for at least partially releasing the vacuum acting on said pressure responsive device to release the clutch elements for movement toward operative engagement with each other, means operative upon initial contact of the clutch elements with each other for checking the motion of the clutch elements toward operative engagement, and means for releasing the clutch elements for movement into operative engagement after their movement has been checked by said last named means.

29. The combination with a motor vehicle clutch having a normal bias to operative condition with the elements thereof in engagement with each other, of a pressure responsive device connected to an operating member of the clutch, a conduit connected to a source of suction and to said device and operative for connecting said device to the source of suction to move the clutch elements out of engagement with each other, means operative upon the admission of atmospheric pressure to said conduit to release the clutch elements for movement toward operative engagement, said pressure responsive device operating to maintain a partial vacuum in said conduit during movement of the clutch plates toward operative engagement, means actuated by a drop in vacuum in said conduit occurring upon initial contact of the clutch elements for checking movement of the clutch elements toward each other, and means for releasing the clutch elements for movement into operative engagement after their movement has been checked by said last named means.

30. The combination with a motor vehicle clutch having a normal bias to operative condition with the elements thereof in engagement with each other, of a conduit connected to a source of suction and to said device and operative for connecting said device to the source of suction to move the clutch elements out of engagement with each other, means operative upon the admission of atmospheric pressure to said conduit to release the clutch elements for movement toward operative engagement, said pressure responsive device operating to maintain a partial vacuum in said conduit during movement of the clutch elements toward operative engagement, an elastically actuated valve operable to closed position by a drop in vacuum in said passage occurring upon initial contact of the clutch elements for checking movement of the clutch elements toward operative engagement, and means for releasing the clutch elements for movement into operative engagement after their movement has been checked by said last named means.

31. In a pneumatic apparatus for actuating a movable member of a mechanism adapted to operate the power transmission clutch of a motor car, comprising a cylinder open to the atmosphere at one end and connected to the intake manifold of the motor at the other, a manually operable valve in said connection, a piston in said cylinder connected to said clutch operating member, and a spring normally tending to produce a clutch engaging movement of said member, whereby, when said valve in the intake manifold connection is opened said member will be pulled into a clutch disengaging position, the combination, with said above described apparatus, of automatic means adapted to produce a relatively rapid clutch engaging movement of said movable member followed by a slower movement for completion of the engagement comprising a valve adapted to open and admit air to that end of said cylinder which is connected to said manifold, a spring normally tending to hold said valve closed and having a degree of tension sufficient to hold it closed during the latter portion of the travel of said movable member which produces clutch engagement while the force of said clutch closing spring is partially reduced, but permitting said valve to open while the piston is subjected to the pull of the full force of said clutch springs at the beginning of its outward movement, and automatic means for holding said valve closed during the clutch disengaging movement of said piston and movable member connected thereto.

32. An apparatus such as defined in claim 31 combined with means for slowly admitting a separate supply of air to said cylinder during said latter portion of the travel of said movable member.

33. In an automotive vehicle provided with a clutch-actuating member, power means for operating said clutch actuating member including a pneumatic motor and valve mechanism for controlling the operation of said clutch operating motor, said valve mechanism comprising means for initiating the clutch disengaging and engaging operations of said motor, and further comprising means operable in acordance with the degree of vacuum within one end of the air chamber of said motor to abruptly reduce the rate of movement of the aforementioned clutch-actuating member as the clutch is being engaged.

34. In an automotive vehicle provided with a clutch comprising driving and driven members, fluid pressure operated power means for disengaging the clutch and controlling the engagement thereof, said power means comprising a valve automatically operable, when the driving and driven members of the clutch contact one with another, to vary the fluid pressure of said power means to thereby decrease the rate of engagement of the clutch.

35. In combination with a power actuated automotive clutch having driving and driven members, power means for disengaging said clutch members and controlling the engagement thereof, said power means comprising means, automatically operable when the clutch members contact and automatically compensating for wear of said members, to decrease the rate of movement of the driven clutch member as it moves into engagement with the driving member to thereby retard the completion of the clutch engaging operation of said power means.

36. In an automotive vehicle provided with an internal-combustion engine and a clutch actuating member, pressure differential operated means for operating said clutch actuating member comprising a motor operably connected to the clutch, a fluid transmitting connection interconnecting one end of said motor with the engine, and valve means for controlling the flow of power fluid to and from said motor, said valve means comprising means operable to alternately open and close the fluid transmitting connection to initiate the clutch engaging and disengaging operations of said motor, and further comprising other means operative to so control the pressure of the power fluid within said motor as to effect a relatively rapid first stage of engaging movement of the clutch, and further operative to automatically appreciably change the pressure of the power fluid within said motor when the friction elements of the clutch contact one with the other.

37. Clutch control mechanism for an automotive vehicle provided with a clutch having driving and driven elements and comprising in combination therewith, a pressure differential operated motor operably connected with the clutch, a primary control valve operative to initiate the disengaging and engaging operations of said motor and a pressure differential operated valve, operable when the clutch elements initially contact, to automatically vary the rate of clutch engagement.

38. In an automotive vehicle provided with a clutch having driving and driven elements, power means for operating said clutch comprising a pressure differential operated motor operably connected to the driven element of the clutch, a control valve for initiating the clutch disengaging and engaging operations of said motor, and other valve means for controlling the clutch engaging operation of the motor comprising means controlled by a spring, the atmosphere and the fluid pressure of the motor and automatically operative, when the elements of the clutch initially contact, to retard the engagement of the clutch.

39. In an automotive vehicle provided, with an intake manifold and a clutch having driving and driven elements, a pressure differential operated motor operably connected with the driven element of the clutch, a fluid transmitting connection interconnecting said manifold and motor, a primary valve incorporated in said connection, a secondary valve, means for controlling the clutch engaging operation of the motor, yieldable means acting on said latter valve, means for connecting said secondary valve means with the atmosphere, and fluid transmitting means interconnecting said secondary valve with the motor, said parts being so constructed and arranged that with operation of said primary valve to initiate a clutch engaging operation of the motor, the secondary valve remains operative to admit atmosphere to the motor and effect a relatively rapid engaging movement of the driven clutch element until the driven clutch element is moved into contact with the driving clutch element, whereupon the secondary valve is automatically operated to in part close off the communication of the motor with the atmosphere and thereby effect a retardation in the clutch engaging movement of the driven clutch element.

40. In a pneumatically operated clutch actuating apparatus comprising a movable clutch controlling member, a spring tending to move said member in a direction to close the clutch and a pneumatic motor device tending to move said member in a clutch opening direction when air is exhausted therefrom, the combination with said above described apparatus of a valve controlling the admission of air to the interior of said pneumatic device and means for automatically closing said valve whenever the subatmospheric pressure in said motor device rises to a certain amount, said pneumatic motor device having another means for admitting air to its interior in very small volume; whereby after said automatically controlled valve has been closed, air may still be admitted to the interior of said pneumatic device, but much more slowly, the original speed of clutch closing being thereby correspondingly slowed down.

41. In a mechanism for operating the clutch of an automotive vehicle, the combination of a pressure-differential operated motor, valve means for controlling the clutch-disengaging operations of said motor, and automatic means for so controlling the clutch-engaging operation of the motor as to sharply check further increase of pressure between the clutch surfaces whenever relatively close contact between the driving and driven elements of the clutch has occurred; whereby any period of rapid, substantially free movement of one of said elements toward the other occurring in any clutch-closing cycle is automatically terminated at the moment of such contact, however much the contact surfaces may have been worn down by use or built up by lining renewals or other adjustments.

42. In an automatic clutch-actuating apparatus, the combination of a fluid-containing receptacle, an element adapted to be moved by variations of fluid pressure in said receptacle, an operative connection from said element to a clutch-actuating member, and a valve controlling passage of air between the exterior atmosphere and the interior of said receptacle which is automatically operable whenever the pressure differential on said element is varied to a predetermined extent.

43. In an automatic clutch-actuating apparatus, the combination of a servo-motor operable by variations of air pressures therein, a motion-transmitting connection from said servo-motor to a clutch-actuating member, and automatic means for substantially checking any clutch-closing operation of said servo-motor whenever the pressure of air then existing in a chamber therein rises a predetermined amount per unit of area of the interior surface of said chamber exposed to such pressure.

44. In an automatic clutch-actuating apparatus, the combination of a fluid-containing receptacle, an element adapted to be moved by variations of fluid pressure in said receptacle, an operative connection from said element to a clutch-actuating member, and a valve controlling passage of air between the exterior atmosphere and the interior of said receptacle which is automatically operable whenever the pressure differential on said element is reduced to a predetermined amount.

JAMES H. K. McCOLLUM.
HENRY J. DE N. McCOLLUM.